United States Patent
Liu et al.

(10) Patent No.: US 10,703,943 B2
(45) Date of Patent: Jul. 7, 2020

(54) PROCESSING TAPE FOR OPTICAL ARTICLES

(71) Applicant: 3M INNOVATIVE PROPERTIES COMPANY, St. Paul, MN (US)

(72) Inventors: Lan H. Liu, Rosemount, MN (US); Edward J. Kivel, Stillwater, MN (US); Steven D. Solomonson, Shoreview, MN (US); Stephen A. Johnson, Woodbury, MN (US)

(73) Assignee: 3M INNOVATIVE PROPERTIES COMPANY, St. Paul, MN (US)

(*) Notice: Subject to any disclaimer, the term of this patent is extended or adjusted under 35 U.S.C. 154(b) by 93 days.

(21) Appl. No.: 16/066,170

(22) PCT Filed: Dec. 27, 2016

(86) PCT No.: PCT/US2016/068648
§ 371 (c)(1),
(2) Date: Jun. 26, 2018

(87) PCT Pub. No.: WO2017/117093
PCT Pub. Date: Jul. 6, 2017

(65) Prior Publication Data
US 2019/0010371 A1    Jan. 10, 2019

Related U.S. Application Data

(60) Provisional application No. 62/272,796, filed on Dec. 30, 2015.

(51) Int. Cl.
| | | |
|---|---|---|
| C09J 167/07 | (2006.01) | |
| C09J 4/06 | (2006.01) | |
| C08L 33/14 | (2006.01) | |
| C09J 7/38 | (2018.01) | |
| C09J 7/22 | (2018.01) | |
| G02B 1/111 | (2015.01) | |
| B82Y 30/00 | (2011.01) | |

(52) U.S. Cl.
CPC ............ *C09J 167/07* (2013.01); *C08L 33/14* (2013.01); *C09J 4/06* (2013.01); *C09J 7/22* (2018.01); *C09J 7/38* (2018.01); *C09J 7/385* (2018.01); *G02B 1/111* (2013.01); *B82Y 30/00* (2013.01); *C09J 2201/622* (2013.01); *C09J 2203/326* (2013.01); *C09J 2433/00* (2013.01); *C09J 2467/006* (2013.01); *G02B 2207/101* (2013.01)

(58) Field of Classification Search
None
See application file for complete search history.

(56) References Cited

U.S. PATENT DOCUMENTS

| | | | |
|---|---|---|---|
| RE24,906 E | 12/1960 | Ulrich | |
| 6,887,917 B2 * | 5/2005 | Yang | ............... C08F 290/061 |
| | | | 522/90 |
| 2013/0084459 A1 * | 4/2013 | Larson | ...................... C09J 4/00 |
| | | | 428/422 |

FOREIGN PATENT DOCUMENTS

| | | |
|---|---|---|
| CN | 103725245 | 4/2014 |
| EP | 0372756 | 6/1990 |
| EP | 0628616 | 12/1994 |
| JP | S58093765 | 6/1983 |
| JP | S61118480 | 6/1986 |
| JP | 2002-79600 | 3/2002 |
| JP | 2003-27709 | 1/2003 |
| WO | WO 2012-054680 | 4/2012 |
| WO | WO 2012-121858 | 9/2012 |

OTHER PUBLICATIONS

Czech Zbigniew et al., "Unsupported Self-Adhesive Tapes With Different Adhesiveness on Either Side and Method for Their Manufacture", English translation of EP 0628616A1, published on Dec. 24, 1994 (Year: 1994).*
Qiao Ligen et al., "Solvent-Free UV (Ultraviolet) Curing Glue for Optical Transparent Adhesive Tapes and Preparation Method and Application Thereof", English translation of CN103725245A, published on Apr. 16, 2014 (Year: 2014).*
Smith, "Modern Optical Engineering", McGraw-Hill,1966, pp. 104-105.
Wicht, "Nanoporous Films with Low Refractive Index for Large-Surface Broad-Band Antireflection Coatings", Macromolecular Materials and Engineering, 2010, vol. 295, pp. 628-636.
Sood, "Development of Nanostructured Antireflection Coatings for EO/IR Sensor and Solar Cell Applications, Materials Sciences and Applications", 2012, vol. 3, pp. 633-639.
International Search report for PCT International Application No. PCT/US2016/068648 dated Mar. 17, 2017, 5 pages.

* cited by examiner

*Primary Examiner* — Anish P Desai
(74) *Attorney, Agent, or Firm* — Jeffrey M. Olofson

(57) ABSTRACT

Processing tapes for use in preparing optical articles include a thermally stable tape backing and a low tack adhesive layer at least partially coated on tape backing. The low tack adhesive layer includes a crosslinked, polyester-containing (meth)acrylate-based polymer that is essentially free of volatile components, is unchanged after heat aging of 150 C for 1 hour under a pressure of 4.31 kiloPascals, and is able to removably adhere to the anti-reflective, nanostructured surface coating of an optical construction.

18 Claims, 1 Drawing Sheet

PROCESSING TAPE FOR OPTICAL ARTICLES

FIELD OF THE DISCLOSURE

The present disclosure relates generally to the field of adhesives and tapes, specifically to the field of tapes useful as processing tapes in the preparation of optical articles.

BACKGROUND

Adhesives have been used for a variety of marking, holding, protecting, sealing and masking purposes. Adhesive tapes generally comprise a backing, or substrate, and an adhesive. One type of adhesive, a pressure sensitive adhesive, is particularly useful for many applications. Pressure sensitive adhesives are well known to one of ordinary skill in the art to possess certain properties at room temperature including the following: (1) aggressive and permanent tack at room temperature, (2) adherence with no more than finger pressure, (3) sufficient ability to hold onto an adherend, and (4) sufficient cohesive strength to be removed cleanly from the adherend. Materials that have been found to function well as pressure sensitive adhesives are polymers designed and formulated to exhibit the requisite viscoelastic properties resulting in a desired balance of tack, peel adhesion, and shear strength. The most commonly used polymers for preparation of pressure sensitive adhesives are natural rubber, synthetic rubbers (e.g., styrene/butadiene copolymers (SBR) and styrene/isoprene/styrene (SIS) block copolymers), various (meth)acrylate (e.g., acrylate and methacrylate) copolymers and silicones. Each of these classes of materials has advantages and disadvantages.

One class of pressure sensitive adhesive polymeric materials are (meth)acrylate polymers. These polymers contain acrylate and/or methacrylate monomers and may also contain reinforcing monomers such as, for example, (meth) acrylic acid. Many patents and publications describe the preparation of these polymers and pressure sensitive adhesive articles made from them, including, for example, U.S. Pat. No. RE 24,906 (Ulrich) which concerns pressure sensitive adhesive copolymer of about 88-97 parts of acrylic acid ester of non-tertiary alcohol, the alkyl groups of which have an average of 4-12 carbon atoms in the alkyl group, and correspondingly about 12-3 parts by weight of at least one modifying copolymerizable monomer such as acrylic acid, itaconic acid or acrylamide. A tape coated with the copolymer exhibits excellent adhesion and holding power, and the adhesive coating experiences no observable deterioration even after the tape has been stored for a number of years. Such tapes are widely used for a variety of purposes.

Pressure sensitive adhesive tapes that are used in the manufacture of articles to protect or temporarily hold in place components of the article during processing are sometimes called processing tapes. Examples of processing tapes include, for example, wafer dicing tapes, where the dicing tape may also function as a die attach adhesive for dicing thinned wafers and subsequent die attach operations of the diced chips in semiconductor device fabrication. Another example of a processing tape is a masking tape, where the masking tape is applied to a surface to cover it and protect it from being painted, the paint is applied, and the masking tape is removed to give a surface with adjacent areas that are painted and unpainted. Typically the processing tape is not retained in the final article, but is removed following one or more processing steps. In some instances, processing tapes are subjected to extreme conditions such as high temperatures, high pressures, exposure to chemicals such as solvents, abrasives, etching materials, and the like and yet are expected to remain adhered during the processing steps without flowing, dripping or slipping and also to be removable after the processing steps are completed.

SUMMARY

Disclosed herein are processing tapes, methods of using the processing tapes, and optical laminates prepared with the processing tapes.

Among the embodiments are tapes comprising a thermally stable tape backing with a first major surface and a second major surface, and a low tack adhesive layer at least partially coated on the first major surface of the tape backing. The low tack adhesive layer comprises a crosslinked, polyester-containing (meth)acrylate-based polymer that is essentially free of volatile components, is unchanged after heat aging of 150° C. for 1 hour under a pressure of 4.31 kiloPascals, and is able to removably adhere to an anti-reflective, nanostructured surface coating of an optical construction.

Also disclosed are embodiments of optical laminates comprising an optical construction, where the optical construction comprises a heat resistant film comprising a first major surface and a second major surface, with an anti-reflective, nanostructured surface coating on the second major surface, and a tape removably adhered to the anti-reflective, nanostructured surface coating on the second major surface of the optical construction. The tape comprises a thermally stable tape backing with a first major surface and a second major surface, and a low tack adhesive layer at least partially coated on the first major surface of the tape backing. The low tack adhesive layer comprises a crosslinked, polyester-containing (meth)acrylate-based polymer that is essentially free of volatile components, is unchanged after heat aging of 150° C. for 1 hour under a pressure of 4.31 kiloPascals.

Also disclosed are methods of preparing optical articles where the method comprises providing an optical construction comprising a heat resistant film comprising a first major surface and a second major surface, with an anti-reflective, nanostructured surface coating on the second major surface, providing a tape, adhering the low tack adhesive layer of the tape to the anti-reflective, nanostructured surface coating on the second major surface of the optical construction to form an optical laminate, subjecting the optical laminate to a temperature of 150° C. for 1 hour under a pressure of 4.31 kiloPascals, and cleanly removing the tape from the anti-reflective, nanostructured surface coating on the second major surface of the optical construction. The tape comprises a thermally stable tape backing with a first major surface and a second major surface, and a low tack adhesive layer at least partially coated on the first major surface of the tape backing. The low tack adhesive layer comprises a crosslinked, polyester-containing (meth)acrylate-based polymer that is essentially free of volatile components, is unchanged after heat aging of 150° C. for 1 hour under a pressure of 4.31 kiloPascals.

BRIEF DESCRIPTION OF THE DRAWINGS

The present application may be more completely understood in consideration of the following detailed description of various embodiments of the disclosure in connection with the accompanying drawings.

Figure 1:
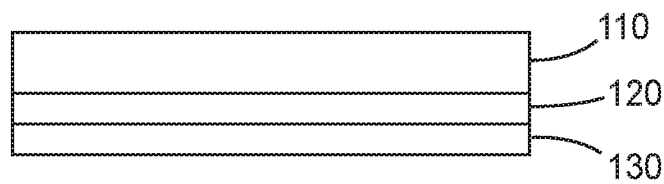
FIG. 1 is a cross sectional view of an embodiment of a tape article of the present disclosure.

In the following description of the illustrated embodiments, reference is made to the accompanying drawings, in which is shown by way of illustration, various embodiments in which the disclosure may be practiced. It is to be understood that the embodiments may be utilized and structural changes may be made without departing from the scope of the present disclosure. The figures are not necessarily to scale. Like numbers used in the figures refer to like components. However, it will be understood that the use of a number to refer to a component in a given figure is not intended to limit the component in another figure labeled with the same number.

DETAILED DESCRIPTION

The use of adhesive tapes is increasing. Among the areas in which the use of adhesive tapes is increasing are the medical, electronic and optical industries, as well as the manufacture of consumer goods and other articles, including security documents. The requirements of these industries require adhesive tapes with specialized features. For example, adhesive tapes are needed that provide additional features beyond the traditional tape properties of tack, peel adhesion and shear strength.

Among the class of adhesive tapes that require specialized properties are processing tapes. Processing tapes are adhesive tapes that are used in the manufacture of articles to protect or temporarily hold in place components of the article during processing. Examples of processing tapes are described above.

The processing tapes of this disclosure are suitable for use in the preparation of optical articles. The class of processing tapes prepared and used in this disclosure are sometimes referred to as "premask tapes". The term premask is used in the screen print industry and generally refers to a low to medium tack paper masking tape that covers a one piece printed graphic. This paper premask protects the decal during storage, transport and handling. The stability of the thick premium grade paper also gives the graphic additional body which aids installation of the vinyl film. The processing tapes of the present disclosure are similar to premask tapes, but the backing is not paper, and they are not used to protect a printed graphic. The terms "processing tape" and premask tape" are used interchangeably in this disclosure.

The processing tapes of the present disclosure have a thermally stable backing instead of a thick paper backing, and the adhesive layer adheres to a nanostructured surface. However, the principle is the same, the processing tape is designed to protect a surface through a series of processing steps and is then removed. Upon removal, the surface that was protected is restored to its original properties. In other words, adhering and removing the processing tape does not alter or damage the surface to which it is adhered. These concepts and the materials used to provide the desired features are described in greater detail below.

The processing tapes of this disclosure have a broad range of desired properties, some of which are contradictory properties. For example, since, as will be described more thoroughly below, it is desirable that the adhesive layer of the tape wet out the nanostructured surface to which it is applied, it is desirable that the adhesive be soft and conformable. However, soft and conformable adhesives are not desirable for other processing steps. For example, soft and conformable adhesive layers are likely to flow or ooze when subjected to elevated temperatures and pressures, which is undesirable or even unacceptable in this application. Additionally, as the surfaces that the processing tape is designed to protect are nanostructured surfaces, and often nanoporous surfaces, if the adhesive layer flows into the nooks and crannies of the surface, upon removal of the adhesive layer there is likely either for portions of the adhesive layer (adhesive residue) to be left on the nanostructured surface, or for the adhesive layer to remove portions of the nanostructured surface. Both these outcomes are undesirable and often unacceptable. Thus the adhesive layer has to adhere strongly enough to the nanostructured surface to remain in place and protect the nanostructured surface, but it must not adhere so strongly that it leaves residue on the surface or removes portions of the nanostructured surface. Among the properties desired for the adhesives of the processing tapes of this disclosure, are low tackiness, sufficient wet out to adhere to a nanostructured surface, and thermal stability.

The adhesive layers of the processing tapes of the present disclosure are "low tack adhesives". The properties of these low tack adhesives are defined below, but generally it means that the adhesive layers are viscoelastic materials with properties similar to those of pressure sensitive adhesives, but they lack the permanent and aggressive tack at room temperature that are characteristic of pressure sensitive adhesives. The adhesive layers have some tack to aid in wetting out the nanostructured surface, but the aggressive tack of a pressure sensitive adhesive is likely to result either in adhering so strongly that it leaves residue on the surface or removes portions of the nanostructured surface when removed. However, as will be shown in the Examples section, film layers that are non-tacky do not adhere strongly enough to provide protection for the nanostructured surface.

Also desirable for the processing tapes of the present disclosure are adhesives with useful wet out properties. Specifically, the ability to sufficiently wet out the nanostructured surface to which it is applied, such that the adhesive layer remains adhered to the nanostructured surface during a series of processing steps, including processing steps involving the application of heat and/or pressure, and to remain removable without leaving residue or removing portions of the nanostructured surface. Thus the adhesive layer has a balance of tack and wet out such that it adheres to the nanostructured surface but not so strongly as to leave residue or remove portions of the nanostructured surface.

Thermal stability is another important property of the adhesive layers of the processing tapes of the present disclosure. In this context thermal stability refers not only to the ability of the adhesive to be subjected to elevated temperatures without undergoing chemical changes, but also to the ability to withstand elevated temperature processes without flowing, oozing or becoming non-removable from the nanostructured surface to which it is adhered. Examples of chemical changes that polymeric materials such as the adhesive layers of the present disclosure could undergo upon exposure to elevated temperatures include: degradation, including complete de-polymerization as well as small amounts of chain scission (degradation is undesirable in this application as it is likely to lead to the leaving of residue on the nanostructured surface); and hardening, in which further polymerization occurs (hardening is undesirable in this application as it is likely to lead to either the inability to remove the adhesive layer from the nanostructured surface or to such strong adhesion to the nanostructured surface that damage occurs upon removal). In this application, thermal stability is typically referred to as the adhesive layer remaining unchanged after heat aging.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. For example, reference to "a layer" encompasses embodiments having one, two or more layers. As used in this specification and the appended claims, the term "or" is generally employed in its sense including "and/or" unless the content clearly dictates otherwise.

The term "adhesive" as used herein refers to polymeric compositions useful to adhere together two adherends. Examples of adhesives are pressure sensitive adhesives and low tack adhesives.

Pressure sensitive adhesive compositions are well known to those of ordinary skill in the art to possess properties including the following: (1) aggressive and permanent tack at room temperature, (2) adherence with no more than finger pressure, (3) sufficient ability to hold onto an adherend, and (4) sufficient cohesive strength to be cleanly removable from the adherend. Materials that have been found to function well as pressure sensitive adhesives are polymers designed and formulated to exhibit the requisite viscoelastic properties resulting in a desired balance of tack, peel adhesion, and shear holding power. Obtaining the proper balance of properties is not a simple process.

The term "low tack adhesive" as used herein refers to an adhesive composition that is a viscoelastic material that is similar to a pressure sensitive adhesive composition, but at room temperature has only light tack as opposed to the aggressive tack of pressure sensitive adhesives. By light tack it is meant that the low tack adhesive is slightly tacky to the touch and is able to lightly adhere to substrates.

Unless otherwise indicated, the terms "transparent' and "optically transparent" are used interchangeably and refer to an article, film or adhesive that has a high light transmittance (typically at least 90% transmittance) over at least a portion of the visible light spectrum (about 400 to about 700 nm). The term "transparent film" refers to a film having a thickness and when the film is disposed on a substrate, an image (disposed on or adjacent to the substrate) is visible through the thickness of the transparent film. In many embodiments, a transparent film allows the image to be seen through the thickness of the film without substantial loss of image clarity. In some embodiments, the transparent film has a matte or glossy finish.

The term "(meth)acrylate" refers to monomeric acrylic or methacrylic esters of alcohols. Acrylate and methacrylate monomers or oligomers are referred to collectively herein as "(meth)acrylates". The term "(meth)acrylate-based" when used to describe polymers, refers to polymers that are prepared from (meth)acrylate monomers or reactive materials that contain (meth)acrylate functionality such as (meth) acrylate oligomers. These polymers may contain only (meth)acrylate monomers or they contain monomers that are co-reactive with (meth)acrylates. The (meth)acrylates may be difunctional or higher functionality.

As used herein, the term "polymer" refers to a polymeric material that is a homopolymer or a copolymer. As used herein, the term "homopolymer" refers to a polymeric material that is the reaction product of one monomer. As used herein, the term "copolymer" refers to a polymeric material that is the reaction product of at least two different monomers.

The terms "tackifying resin", "tackifying agent" and "tackifier" are used interchangeably herein.

The terms "plasticizing resin", "plasticizing agent" and "plasticizer" are used interchangeably herein.

The term "alkyl" refers to a monovalent group that is a radical of an alkane, which is a saturated hydrocarbon. The alkyl can be linear, branched, cyclic, or combinations thereof and typically has 1 to 20 carbon atoms. In some embodiments, the alkyl group contains 1 to 18, 1 to 12, 1 to 10, 1 to 8, 1 to 6, or 1 to 4 carbon atoms. Examples of alkyl groups include, but are not limited to, methyl, ethyl, n-propyl, isopropyl, n-butyl, isobutyl, tert-butyl, n-pentyl, n-hexyl, cyclohexyl, n-heptyl, n-octyl, and ethylhexyl.

As used herein, the term "wet out" when referring to an adhesive layer refers to the ability of the adhesive to spontaneously spread out upon and bond to the contact surface.

As used herein, the term "nanostructured" when referring to a coating on a surface, refers to a coating that comprises nanostructures. A nanostructure is a structure of intermediate size between microscopic and molecular structures. Nanostructural detail is microstructure at nanoscale. As used herein, the term "microstructure" means the configuration of features wherein at least 2 dimensions of the features are microscopic. The topical and/or cross-sectional view of the features must be microscopic. As used herein, the term "microscopic" refers to features of small enough dimension so as to require an optic aid to the naked eye when viewed from any plane of view to determine its shape. One criterion is found in *Modern Optic Engineering* by W. J. Smith, McGraw-Hill, 1966, pages 104-105 whereby visual acuity, " . . . is defined and measured in terms of the angular size of the smallest character that can be recognized." Normal visual acuity is considered to be when the smallest recognizable letter subtends an angular height of 5 minutes of arc on the retina. At typical working distance of 250 mm (10 inches), this yields a lateral dimension of 0.36 mm (0.0145 inch) for this object. Nanostructured surfaces contain structural features that are between 0.1 and 100 nanometers in size in at least two dimensions. In some embodiments of this disclosure, the nanostructured surface is nanoporous. As used herein, the term "nanoporous" refers to coating that has a regular, porous structure. The size of the pores is generally 100 nanometers or smaller.

The terms "room temperature" and "ambient temperature" are used interchangeably and refer to a temperature of from 20-25° C.

The terms "Tg" and "glass transition temperature" are used interchangeably and refer to the glass transition temperature of a polymeric composition. Unless otherwise specified, the glass transition temperature, if measured, is measured by DSC (Differential Scanning calorimetry) using well understood techniques (typically with a heating time of 10° C. per minute). More typically the Tg is calculated using the well-known and understood Fox equation with monomer Tg values provided by the monomer supplier, as is well understood by one of skill in the polymer arts.

Disclosed herein are processing tapes comprising a thermally stable tape backing with a first major surface and a second major surface; and a low tack adhesive layer at least partially coated on the first major surface of the tape backing, wherein the low tack adhesive layer comprises a crosslinked, polyester-containing (meth)acrylate-based polymer that is essentially free of volatile components, is unchanged after heat aging of 150° C. for 1 hour under a pressure of 4.31 kiloPascals, and is able to removably adhere to an anti-reflective, nanostructured surface coating of an optical construction.

The processing tape includes a thermally stable tape backing. By "thermally stable tape backing" it is meant that the tape backing is able to be exposed to the elevated temperature conditions processing conditions desired for the tape article without chemical or physical change, that is to say without degrading, hardening, shrinking, buckling wrinkling or the like.

In some embodiments, the thermally stable tape backing is a polymeric film comprising a polyester film. Examples of thermally stable polyester films include certain polyesters such as annealed polyethylene terephthalate (PET), amorphous co-polyesters such as those commercially available from Eastman Chemicals as "TRITAN".

In some embodiments, the thermally stable tape backing is used as is, in other embodiments, the thermally stable tape backing has at least one treated surface. A wide range of surface treatments are suitable to help improve the adhesion of the adhesive layer to the thermally stable tape backing. The surface treatments may be physical surface treatments, chemical surface treatments, or a combination of physical and chemical surface treatments.

Examples of suitable physical surface treatments include, for example, corona treatment, plasma treatment and flame treatment, with corona treatment being particularly suitable. These techniques are well known in the film arts to provide a modified surface.

Examples of suitable chemical surface treatments include, for example, the application of a primer. Primers are known surface treatment agents that can be applied to a film surface to provide a chemically modified surface. The applied adhesive layer forms a stronger bond to this chemically modified surface than it would to the surface without the primer present.

Among the suitable primers for use to modify a surface of a thermally stable tape backing are aqueous primers. Aqueous primers are those in which the primer materials are dissolved or suspended in water. Aqueous primers are particularly suitable because solvent-based primers could partially dissolve the film surface causing dimensional changes, structural changes or optical changes, that is to say, the films could become thinner, weaker or opaque. Aqueous primers, however have not been found to cause these undesirable changes in films, such as thermally stable tape backings. Particularly suitable aqueous primers include aqueous primers that include a mixture of silica and organosilanes. Such primers are described in, for example, in European Patent No. EP 372,756.

The primer may be applied to the film surface using any suitable coating technique. For example, the primer can be coated by such methods as knife coating, roll coating, gravure coating, rod coating, spray coating, curtain coating, and air knife coating. The primer may also be printed by known methods such as screen printing or inkjet printing. The coated aqueous primer layer is then dried to remove the water and any additional water-miscible co-solvents that might be present. Typically, the coated primer layer is subjected to elevated temperatures, such as those supplied by an oven, to expedite drying of the primer layer.

In some embodiments, it may be desirable to use a combination of surface treatments. For example, the dimensionally stable transparent polymeric film may be subjected to corona treatment and then have an aqueous primer applied to the surface.

While a wide range of thicknesses are suitable for the thermally stable tape backing, typically the thermally stable tape backing has a thickness of from 51 micrometers to 102 micrometers (2-4 mils).

The tapes also include a low tack adhesive layer. The low tack adhesive layer comprises a crosslinked, polyester-containing (meth)acrylate-based polymer that is essentially free of volatile components, is unchanged after heat aging of 150° C. for 1 hour under a pressure of 4.31 kiloPascals, and is able to removably adhere to an anti-reflective, nanostructured surface coating of an optical construction.

A wide variety of polyester-containing (meth)acrylate-based polymers can be used to produce the low tack adhesive layer. In some embodiments, the crosslinked polyester-containing (meth)acrylate-based polymer is prepared from a reaction mixture comprising at least one multifunctional, polyester-containing (meth)acrylate, at least one polyester-containing (meth)acrylate oligomer, and an initiator. In these embodiments, the at least one multifunctional, polyester-containing (meth)acrylate serves to crosslink the formed polymer.

A wide variety of multifunctional, polyester-containing (meth)acrylates are suitable for use in preparing the crosslinked polyester-containing (meth)acrylate-based polymer of this disclosure. The level of functionality of the multifunctional, polyester-containing (meth)acrylates can vary depending upon a variety of factors. Typically the multifunctional, polyester-containing (meth)acrylate is tri-functional, tetra-functional or penta-functional, although higher functionality polyester-containing (meth)acrylates can be used. Examples of multifunctional polyester-containing (meth)acrylates include a range of materials commercially available from Sartomer Americas, Exton, Pa. under the trade designation "CN". Examples include the tri-functional CN2634, the tetra-functional CN203, CN292, CN2555, CN2560, and CN2562, and the higher functional CN 2295, CN2203, CN2305, CN291, and CN293. Combinations of multifunctional polyester-containing (meth)acrylates can also be used. Of these, tetra-functional polyester-containing (meth)acrylates have been found to be particular suitable. In some embodiments, the multifunctional polyester-containing (meth)acrylate comprises CN292.

A wide variety of polyester-containing (meth)acrylate oligomers are suitable for preparing the crosslinked polyester-containing (meth)acrylate-based polymer of this disclosure. Typically the polyester-containing (meth)acrylate oligomer is di-functional. Polyester-containing (meth)acrylates that may be suitable include a range of materials commercially available from Sartomer Americas, Exton, Pa. under the trade designation "CN" and those available from Designer Molecules Inc, San Diego, Calif. under the trade designation "PEM". Examples include CN2036, CN2203, CN2267, CN2505, CN2609, CN2610, and CN2273 from Sartomer and PEM-1066 from Designer Molecules Inc. Particularly suitable is the difunctional polyester-containing (meth)acrylate oligomer CN2273.

The composition of the reaction mixture that produces the polyester-containing (meth)acrylate-based polymer in some embodiments comprises 75-85 parts by weight based on 100 total parts by weight of reactive components of at least one multifunctional, polyester-containing (meth)acrylate, and 15-25 parts by weight based on 100 total parts by weight of reactive components of at least one polyester-containing (meth)acrylate oligomer. In some particularly desirable embodiments, the reaction mixture that produces the polyester-containing (meth)acrylate-based polymer in some embodiments comprises 80 parts by weight based on 100 total parts by weight of reactive components of at least one multifunctional, polyester-containing (meth)acrylate, and 20 parts by weight based on 100 total parts by weight of reactive components of at least one polyester-containing (meth)acrylate oligomer. The reactive components are expressed in terms of parts by weight per 100 parts by weight of reactive components. Alternatively, the terms "weight %" or "% by weight" could be used to describe the amount of each reactive component in the reaction mixture.

The reaction mixture also comprises at least one free radical initiator. A variety of initiators are suitable for use in initiating the polymerization. Suitable initiators include thermal initiators and photoinitiators. Thermal initiators useful in the present disclosure include, but are not limited to azo, peroxide, persulfate, and redox initiators.

Suitable azo initiators include, but are not limited to, 2,2'-azobis(2, 4-dimethylvaleronitrile) (VAZO 52); 2,2'-azobisisobutyronitrile) (VAZO 64); 2,2'-azobis-2-methylbutyronitrile (VAZO 67); and (1,1'-azobis(1-cyclohexanecarbonitrile) (VAZO 88), all of which are available from DuPont Chemicals, and 2,2'-azobis(methyl isobutyrate) (V-601) and 2,2'-azobis(2-amidinopropane) dihydrochloride (V-50) available from Wako Chemicals. Also suitable is 2,2'-azobis (4-methoxy-2,4-dimethylvaleronitrile), formerly available from DuPont Chemicals as VAZO 33.

Suitable peroxide initiators include, but are not limited to, benzoyl peroxide, acetyl peroxide, lauroyl peroxide, decanoyl peroxide, dicetyl peroxydicarbonate, di(4-t-butylcyclohexyl) peroxydicarbonate (PERKADOX 16S, available from AkzoNobel Polymer Chemicals), di(2-ethylhexyl) peroxydicarbonate, t-butylperoxypivalate (LUPERSOL 11, available from Atochem), t-butylperoxy-2-ethylhexanoate (TRIGONOX 21-050, available from AkzoNobel Polymer Chemicals, Inc.), and dicumyl peroxide.

Suitable persulfate initiators include, but are not limited to, potassium persulfate, sodium persulfate, and ammonium persulfate.

Suitable redox (oxidation-reduction) initiators include, but are not limited to, combinations of the above persulfate initiators with reducing agents such as sodium metabisulfite and sodium bisulfate; systems based on organic peroxides and tertiary amines (for example, benzoyl peroxide plus dimethylaniline); and systems based on organic hydroperoxides and transition metals, for example, cumene hydroperoxide plus cobalt naphthenate.

Typically the initiator or initiators comprise photoinitiators, meaning that the initiator is activated by light, typically ultraviolet (UV) light. Examples of suitable free radical photoinitiators include DAROCURE 4265, IRGACURE 184, IRGACURE 651, IRGACURE 1173, IRGACURE 819, LUCIRIN TPO, LUCIRIN TPO-L, commercially available from BASF, Charlotte, N.C. Another particularly suitable photoinitiator is ESACURE ONE commercially available from Lamberti USA, Conshohocken, Pa. One concern with photoinitiators is that the initiator fragments left behind after activation can be relatively low molecular weight species that could form residue on the nanostructured surface to which the adhesive layer is attached. As the amount of photoinitiator present is very small, this is often not a large concern. Also, in this regard, the relatively high molecular weight photoinitiator ESACURE ONE is particularly desirable.

Generally the photoinitiator is used in amounts of 0.01 to 1 part by weight, more typically 0.1 to 0.5, parts by weight relative to 100 parts by weight of total reactive components.

The reaction mixture may contain additional reactive or unreactive components, but such components are not necessary and may be detrimental to the final properties of the formed polyester-containing (meth)acrylate-based polymer. Since the polyester-containing (meth)acrylate-based polymer is essentially free of volatile components, it is desirable that such components not be added to the reaction mixture. If volatile components are added, such as for example a solvent, it is desirable that these components be removed from the final polymer product.

In some embodiments, the polyester-containing (meth) acrylate-based polymer that is essentially free of volatile components comprises a polyester-containing (meth)acrylate-based polymer that is free of tackifying resins, plasticizing resins, and unreacted free radically polymerizable compounds. Therefore, it is desirable to not add tackifying resins or plasticizing resins to the reaction mixture or to the polymerized polymer. Additionally, the reactive components are selected such that essentially no volatile unreacted monomeric species are contained within the formed polymeric matrix. The presence of volatile components is undesirable as such components can leave residue on the nanostructured surface to which the tape is adhered. Additionally, the adhesive layers of the present disclosure have the desired properties without the need for property modifying agents.

In some embodiments, the polyester-containing (meth) acrylate-based polymer has a calculated Tg in the range of −30 to −40° C. While not wishing to be bound by theory, it is believed that if the polymer Tg is far outside of this range, the properties of the polymer will not be optimum for use as a processing tape. If the Tg is lower than −40° C., the polymer may be too soft and pliable and the tack may be too high to give a tape that is cleanly removable from the nanostructured surface after the thermal aging cycle. Likewise, if the Tg is higher than −30° C., the polymer may be too stiff and the tack may be too low to give good adhesion to the nanostructured surface. The Tg is generally calculated using the well-known Fox equation using the homopolymer Tg values supplied by the manufacturers of the free radically polymerizable components of the reaction mixture. Such Tg calculations are standard practice in the art.

The low tack adhesive layer can have a variety of thicknesses depending upon the uses for the processing tape is to be used, the thickness and composition of the thermally stable tape backing, as well as other factors. Typically the low tack adhesive layer has a thickness of from 13 micrometers to 25 micrometers (0.5-1.0 mils).

Also disclosed herein are optical laminates. The optical laminates comprise an optical construction and a processing tape and may also comprise other layers and films. The optical construction comprises a heat resistant film comprising a first major surface and a second major surface, with an anti-reflective, nanostructured surface coating on the second major surface. The optical construction may include additional layers such as primer layers, hardcoat layers and the like. In some embodiments, a primer layer is present between the second major surface of the heat resistant film and the anti-reflective, nanostructured surface coating. Also, in some embodiments, the first major surface of the heat resistant film comprises additional coatings, layers or films adhered thereto.

The processing tape comprises a processing tape of the type described above. The processing tape is removably adhered to the to the anti-reflective, nanostructured surface coating on the second major surface of the heat resistant film. The processing tape comprises a thermally stable tape backing with a first major surface and a second major surface, and a low tack adhesive layer at least partially coated on the first major surface of the tape backing, wherein the low tack adhesive layer comprises a crosslinked, polyester-containing (meth)acrylate-based polymer that is essentially free of volatile components, is unchanged after heat aging of 150° C. for 1 hour under a pressure of 4.31 kiloPascals. The properties and constituent components of the processing tape are described in detail above.

The optical construction comprises a heat resistant film. A wide range of heat resistant films are suitable. As the name implies, the heat resistant films are designed to withstand exposure to elevated temperatures without degrading, buckling, wrinkling, etc. Examples of suitable heat resistant films include those films described above as thermally stable tape backings, as well as films made of these same materials. Heat resistant polyester materials are particularly suitable. Typically the heat resistant film is optically clear. In some embodiments, the heat resistant film has a primer applied to one surface to improve adhesion. Typical properties for suitable heat resistant films include: high optical properties such as total light transmission of greater than 90%, haze of less than 1%; and low shrinkage properties such as MD Shrinkage of less than 0/1% and TD Shrinkage of 0% after 30 minutes at 150° C., (where MD=machine direction, and TD=transverse direction).

Often the optical construction is part of a larger optical article or device, and can be incorporated into the article or device after the processing tape is removed. Typical applications include flexible electronics, touch screens, displays, circuitry, and other industrial uses where high light transmission and excellent thermal stability are required.

While a wide range of thicknesses are suitable for the heat resistant film, typically the heat resistant film has a thickness of from 51 micrometers to 102 micrometers (2-4 mils).

The optical construction also comprises an anti-reflective, nanostructured surface coating on the second major surface of the heat resistant film. An antireflective or antireflection (AR) coating is a type of optical coating applied to the surface of lenses and other optical elements to reduce reflection. In typical imaging systems, this improves the efficiency since less light is lost.

Various AR polymer films have been described. AR films are often constructed of alternating high and low refractive index polymer layers of the correct optical thickness. With regards to visible light, this thickness is on the order of one-quarter of the wavelength of the light to be reflected. The human eye is most sensitive to light around 550 nm. Therefore it is desirable to design the low and high index coating thicknesses in a manner that minimizes the amount of reflected light in this optical range.

Antireflection films have been described that comprise nanoporous layers coated on transparent substrates. Examples include JP Patent No. 2002-79600, the journal articles: *Nanoporous Films with Low Refractive Index for Large-Surface Broad-Band Antireflection Coatings*, Macromolecular Materials and Engineering, 2010, 295, 628-636; and *Development of Nanostructured Antireflection Coatings for EO/IR Sensor and Solar Cell Applications*, Materials Sciences and Applications, 2012, 3, 633-639; and PCT Patent Publication No. 2012/121858.

These antireflection coatings use a gradient of refractive indices and have a nanoporous outermost layer. These antireflection coatings can become degraded or damaged in subsequent processing steps such as processing steps that involve modification of the non-AR coated side of the optical construction. In particular, steps that involve the use of heat and pressure can damage the AR layer. Thus the processing tape of the present disclosure is used as a premask tape to cover and protect the nanostructured AR layer during processing steps. After the processing steps, the premask tape can be removed to again uncover the nanostructured AR layer.

A wide variety of nanostructured antireflection coatings can be present on the heat resistant film of the optical construction. In some instances the nanostructured antireflection coating is a nanoporous coating. A wide variety of nanoporous antireflective coatings are possible. In some embodiments, the nanostructured antireflection coating is a nanoporous coating comprising large particle size fumed silica in a polymeric resin binder as described in PCT Patent Publication No. 2012/121858.

In some embodiments, the nanostructured antireflection coating is coated directly on the heat resistant film surface, in other embodiments, the heat resistant film contains a primer layer. Primers are known surface treatment agents that can be applied to a film surface to provide a chemically modified surface. The applied nanostructured antireflection coating layer forms a stronger bond to this chemically modified surface than it would to the surface without the primer present.

Among the suitable primers for use to modify a surface of the heat resistant film are aqueous primers. Aqueous primers are those in which the primer materials are dissolved or suspended in water. Aqueous primers are particularly suitable because solvent-based primers could partially dissolve the film surface causing dimensional changes, structural changes or optical changes, that is to say, the films could become thinner, weaker or opaque. Aqueous primers, however have not been found to cause these undesirable changes in films, such as thermally stable tape backings. Particularly suitable aqueous primers include aqueous primers that include a mixture of silica and organosilanes. Such primers are described in, for example, in European Patent No. EP 372,756.

Also disclosed are methods of preparing optical articles. These methods comprise preparing an optical laminate as described above. The optical laminate is prepared by providing an optical construction comprising a heat resistant film comprising a first major surface and a second major surface, with an anti-reflective, nanostructured surface coating on the second major surface, providing a processing tape comprising a thermally stable tape backing with a first major surface and a second major surface, and a low tack adhesive layer at least partially coated on the first major surface of the tape backing, adhering the low tack adhesive layer of the tape to the anti-reflective, nanostructured surface coating on the second major surface of the optical construction. As described above, the low tack adhesive layer of the processing tape comprises a crosslinked, polyester-containing (meth)acrylate-based polymer that is essentially free of volatile components, is unchanged after heat aging of 150° C. for 1 hour under a pressure of 4.31 kiloPascals, and is able to removably adhere to the anti-reflective, nanostructured surface of the optical construction. The optical laminate is subjected to a temperature of 150° C. for 1 hour under a pressure of 4.31 kiloPascals, and the tape is cleanly removed from the anti-reflective, nanostructured surface coating on the second major surface of the optical construction. The components and properties of the processing tapes and optical constructions have been described in detail above.

Typically, the optical laminate is formed by room temperature lamination of the processing tape to the optical construction. In some embodiments, the optical laminate can optionally be formed by heat lamination. By this it is meant that heat is applied during lamination to soften the low tack adhesive layer of the processing tape and provide increased wet out on the nanostructured antireflective coating layer of the optical construction.

Upon removal of the processing tape, the resulting nanostructured antireflective coating layer retains the properties that it had prior to the application of the processing tape. In other words, the lamination of the processing tape to the nanostructured antireflective coating layer and the application of heat and pressure does not affect the properties of the nanostructured antireflective coating layer. As discussed above, the processing tape has not left residue on the nanostructured antireflective coating layer, nor has the processing tape damaged the nanostructured antireflective coating layer. The properties of the nanostructured antireflective coating layer can be measured in a variety of ways, such as by measurements of the reflectance of the coatings. Techniques for measuring the reflectance of the nanostructured antireflective coating layers both before the application of the processing tape and after the removal of the processing tape are described in the Examples section.

Embodiments of the processing tapes, optical constructions, optical laminates, and the processing steps that utilize these articles are further illustrated by the Figures.

FIG. 1 is a cross sectional view of an embodiment of a processing tape of this disclosure. FIG. 1 shows processing tape 100 comprising thermally stable tape backing 110 and low tack adhesive layer 130. Each of these elements is described in detail above. Additionally, FIG. 1 also shows optional primer layer 120 located between thermally stable tape backing 110 and low tack adhesive layer 130.

Figure 2:
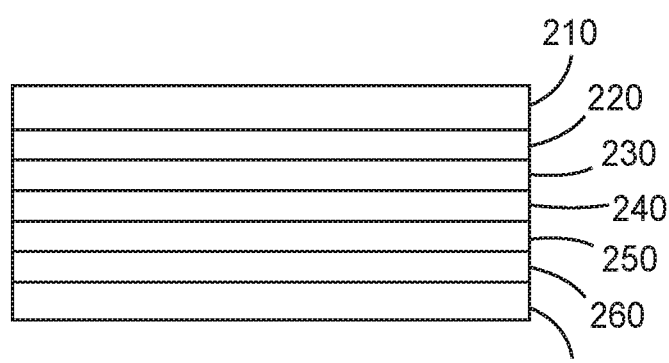
FIG. 2 is a cross sectional view of an embodiment of an optical laminate of the present disclosure.

FIG. 2 is a cross sectional view of an embodiment of an optical laminate of this disclosure. In the optical laminate, the processing tape of FIG. 1 is laminated to an optical construction to form the optical laminate. Optical laminate 200 of FIG. 2 comprises thermally stable tape backing 210, low tack adhesive layer 230, optional primer layer 220 located between thermally stable tape backing 210 and low tack adhesive layer 230, as described above in FIG. 1. The optical laminate further comprises heat resistant film 260, and nanostructured antireflective coating layer 240, as well as optional primer layer 250 between heat resistant film 260 and nanostructured antireflective coating layer 240, and optional coating layer 270 on the first major surface of the heat resistant film 260. The optional coating layer 270 can be, for example, a hard coat layer. It is understood that heat resistant film 260, nanostructured antireflective coating layer 240, as well as optional layers 270 and 250 as a unit comprise an optical construction.

Figure 3:
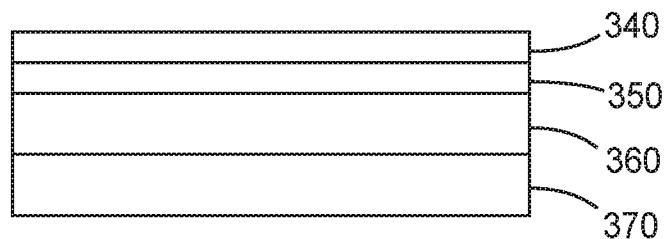
FIG. 3 is a cross sectional view of an embodiment of an optical article prepared using the methods of the present disclosure.

FIG. 3 is a cross sectional view of an embodiment of an optical construction of this disclosure. In this case the optical construction is the optical construction resulting from the removal of the processing tape from the optical laminate of FIG. 2. The optical construction 300 comprises heat resistant film 360, and nanostructured antireflective coating layer 340, as well as optional primer layer 350 between heat resistant film 360 and nanostructured antireflective coating layer 340, and optional coating layer 370 on the first major surface of the heat resistant film 360. The optional coating layer 370 can be, for example, a hard coat layer.

The disclosure includes the following embodiments:

Among the embodiments are tapes. Embodiment 1 is a tape comprising: a thermally stable tape backing with a first major surface and a second major surface; and a low tack adhesive layer at least partially coated on the first major surface of the tape backing, wherein the low tack adhesive layer comprises a crosslinked, polyester-containing (meth)acrylate-based polymer that is essentially free of volatile components, is unchanged after heat aging of 150° C. for 1 hour under a pressure of 4.31 kiloPascals, and is able to removably adhere to an anti-reflective, nanostructured surface coating of an optical construction.

Embodiment 2 is the tape of embodiment 1, wherein the thermally stable tape backing comprises at least one polyester material.

Embodiment 3 is that tape of embodiment 1 or 2, wherein the polyester-containing (meth)acrylate-based polymer that is essentially free of volatile components comprises a polyester-containing (meth)acrylate-based polymer that is free of tackifying resins, plasticizing resins, and unreacted free radically polymerizable compounds.

Embodiment 4 is the tape of any of embodiments 1-3, wherein the polyester-containing (meth)acrylate-based polymer is prepared from a reaction mixture comprising: at least one multifunctional, polyester-containing (meth)acrylate; at least one polyester-containing (meth)acrylate oligomer; and an initiator.

Embodiment 5 is the tape of embodiment 4, wherein the reaction mixture comprises: 75-85 parts by weight based on 100 total parts by weight of reactive components of at least one multifunctional, polyester-containing (meth)acrylate; and 15-25 parts by weight based on 100 total parts by weight of reactive components of at least one polyester-containing (meth)acrylate oligomer.

Embodiment 6 is the tape of embodiment 4 or 5, wherein the initiator comprises a photoinitiator.

Embodiment 7 is the tape of any of embodiments 1-6, wherein the polyester-containing (meth)acrylate-based polymer has a calculated Tg in the range of −30 to −40° C.

Embodiment 8 is the tape of any of embodiments 1-7, wherein the thermally stable tape backing has a thickness of from 51 micrometers to 102 micrometers (2-4 mils).

Embodiment 9 is the tape of any of embodiments 1-8, wherein the low tack adhesive layer has a thickness of from 13 micrometers to 25 micrometers (0.5-1.0 mils).

Embodiment 10 is the tape of any of embodiments 1-9, further comprising a primer layer disposed between the first major surface of the thermally stable tape backing and the low tack adhesive layer.

Among the embodiments are optical laminates. Embodiment 11 includes an optical laminate comprising: an optical construction comprising: a heat resistant film comprising a first major surface and a second major surface, with an anti-reflective, nanostructured surface coating on the second major surface; and a tape removably adhered to the anti-reflective, nanostructured surface coating on the second major surface of the optical construction, the tape comprising: a thermally stable tape backing with a first major surface and a second major surface; and a low tack adhesive layer at least partially coated on the first major surface of the tape backing, wherein the low tack adhesive layer comprises a crosslinked, polyester-containing (meth)acrylate-based polymer that is essentially free of volatile components, is unchanged after heat aging of 150° C. for 1 hour under a pressure of 4.31 kiloPascals.

Embodiment 12 is the optical laminate of embodiment 11, wherein the thermally stable tape backing comprises at least one polyester material.

Embodiment 13 is the optical laminate of embodiment 11 or 12, wherein the polyester-containing (meth)acrylate-based polymer that is essentially free of volatile components comprises a polyester-containing (meth)acrylate-based polymer that is free of tackifying resins, plasticizing resins, and unreacted free radically polymerizable compounds.

Embodiment 14 is the optical laminate of any of embodiments 11-13, wherein the polyester-containing (meth)acrylate-based polymer is prepared from a reaction mixture comprising: at least one multifunctional, polyester-containing (meth)acrylate; at least one polyester-containing (meth) acrylate oligomer; and an initiator.

Embodiment 15 is the optical laminate of embodiment 14, wherein the reaction mixture comprises: 75-85 parts by weight based on 100 total parts by weight of reactive components of at least one multifunctional, polyester-containing (meth)acrylate; and 15-25 parts by weight based on 100 total parts by weight of reactive components of at least one polyester-containing (meth)acrylate oligomer.

Embodiment 16 is the optical laminate of embodiment 14 or 15, wherein the initiator comprises a photoinitiator.

Embodiment 17 is the optical laminate of any of embodiments 11-16, wherein the polyester-containing (meth)acrylate-based polymer has a calculated Tg in the range of −30 to −40° C.

Embodiment 18 is the optical laminate of any of embodiments 11-17, wherein the thermally stable tape backing has a thickness of from 51 micrometers to 102 micrometers (2-4 mils).

Embodiment 19 is the optical laminate of any of embodiments 11-18, wherein the low tack adhesive layer has a thickness of from 13 micrometers to 25 micrometers (0.5-1.0 mils).

Embodiment 20 is the optical laminate of any of embodiments 11-19, wherein the tape further comprises a primer layer disposed between the first major surface of the thermally stable tape backing and the low tack adhesive layer.

Embodiment 21 is the optical laminate of any of embodiments 11-20, wherein the heat resistant film comprises a heat resistant polyester film.

Embodiment 22 is the optical laminate of any of embodiments 11-21, wherein the heat resistant film further comprises at least one additional layer or coating.

Embodiment 23 is the optical laminate of embodiment 22, wherein the at least one additional layer or coating on the heat resistant film comprises a primer layer, a hardcoat layer, or combinations thereof.

Among the embodiments are methods of preparing optical articles. Embodiment 24 is a method of preparing an optical article comprising: providing an optical construction comprising: a heat resistant film comprising a first major surface and a second major surface, with an anti-reflective, nanostructured surface coating on the second major surface; providing a tape, the tape comprising: a thermally stable tape backing with a first major surface and a second major surface; and a low tack adhesive layer at least partially coated on the first major surface of the tape backing, wherein the adhesive layer comprises a crosslinked, polyester-containing (meth)acrylate-based polymer that is essentially free of volatile components, is unchanged after heat aging of 150° C. for 1 hour under a pressure of 4.31 kiloPascals, and is able to removably adhere to the anti-reflective, nanostructured surface of the optical construction; adhering the low tack adhesive layer of the tape to the anti-reflective, nanostructured surface coating on the second major surface of the optical construction to form an optical laminate; subjecting the optical laminate to a temperature of 150° C. for 1 hour under a pressure of 4.31 kiloPascals; and cleanly removing the tape from the anti-reflective, nanostructured surface coating on the second major surface of the optical construction.

Embodiment 25 is the method of embodiment 24, wherein the optical construction further comprises additional layers.

Embodiment 26 is the method of embodiment 24 or 25, wherein the optical laminate is formed by heat lamination.

Embodiment 27 is the method of any of embodiments 24-26, wherein the thermally stable tape backing comprises at least one polyester material.

Embodiment 28 is the method of any of embodiments 24-27, wherein the polyester-containing (meth)acrylate-based polymer that is essentially free of volatile components comprises a polyester-containing (meth)acrylate-based polymer that is free of tackifying resins, plasticizing resins, and unreacted free radically polymerizable compounds.

Embodiment 29 is the method of any of embodiments 24-28, wherein the polyester-containing (meth)acrylate-based polymer is prepared from a reaction mixture comprising: at least one multifunctional, polyester-containing (meth)acrylate; at least one polyester-containing (meth) acrylate oligomer; and an initiator.

Embodiment 30 is the method of embodiment 29, wherein the reaction mixture comprises: 75-85 parts by weight based on 100 total parts by weight of reactive components of at least one multifunctional, polyester-containing (meth)acrylate; and 15-25 parts by weight based on 100 total parts by weight of reactive components of at least one polyester-containing (meth)acrylate oligomer.

Embodiment 31 is the method of embodiment 29 or 30, wherein the initiator comprises a photoinitiator.

Embodiment 32 is the method of any of embodiments 24-31, wherein the polyester-containing (meth)acrylate-based polymer has a calculated Tg in the range of −30 to −40° C.

Embodiment 33 is the method of any of embodiments 24-32, wherein the thermally stable tape backing has a thickness of from 51 micrometers to 102 micrometers (2-4 mils).

Embodiment 34 is the method of any of embodiments 24-33, wherein the low tack adhesive layer has a thickness of from 13 micrometers to 25 micrometers (0.5-1.0 mils).

Embodiment 35 is the method of any of embodiments 24-34, further comprising a primer layer disposed between the first major surface of the thermally stable tape backing and the low tack adhesive layer.

EXAMPLES

These examples are merely for illustrative purposes only and are not meant to be limiting on the scope of the appended claims. All parts, percentages, ratios, etc. in the examples and the rest of the specification are by weight, unless noted otherwise. Solvents and other reagents used were obtained from Sigma-Aldrich Chemical Company, Milwaukee, Wis., unless otherwise noted.

| Table of Abbreviations | |
|---|---|
| Abbreviation or Trade Designation | Description |
| Monomer-1 | Tetrafunctional polyester acrylate commercially available from Sartomer Americas, Exton, PA as CN292 |
| Monomer-2 | Difunctional polyester acrylate commercially available from Sartomer Americas, Exton, PA as CN2273 |
| PI-1 | Photoinitiator, commercially available from BASF Corp., Florham Park, NJ as DAROCUR 4265 |

-continued

Table of Abbreviations

| Abbreviation or Trade Designation | Description |
|---|---|
| PI-2 | Photoinitiator, commercially available from BASF Corp., Florham Park, NJ as IRGACURE 184 |
| PI-3 | Photoinitiator, commercially available from Lamberti USA, Conshohocken, PA as ESACURE ONE |
| PEN | Polyethylene naphthalate |
| PET | Polyethylene terephthalate |
| LM-PEN | Low Melt PEN with a thickness of 76 micrometers (3 mils) with a composition of 90% PEN and 10% PET |
| HS-PET | Heat Stabilized PET with a thickness of 51 micrometers (2 mils) commercially available from DuPont, Wilmington, DE as STCH11. |
| Primed HS-PET | Primed Heat Stabilized PET with a thickness of 51 micrometers (2 mils) commercially available from DuPont, Wilmington, DE as STCH11. |
| PBW | Parts by weight |

Test Methods

Reflectance Measurements

Reflectance measurements of the antireflective (AR) coatings were made using a BYK spectro-guide spectrophotometer (BYK-Gardner USA, Chester, N.Y.) which provides the total average reflectance at visible wave lengths, and are reported as percent reflectance (% R). The reflectance of the AR coatings was typically about 1.05-1.25% R. In comparison, Table A provides the percent reflectance of some typical substrates in the absence of AR coatings.

TABLE A

Percent reflectance of substrates without antireflective coatings.

| Reference material | Substrate | % R |
|---|---|---|
| 1 | 2 mil primed HS-PET | 4.87% |
| 2 | 2 mil unprimed HS-PET | 6.64% |
| 3 | 3 mil primed low melt PEN | 4.54% |
| 4 | 3 mil unprimed low melt PEN | 7.77% |

Acceptance Criteria for Premasks

The ability of the high temperature premasks to protect nanostructured antireflective surfaces was tested by laminating the premasks to the nanostructured surfaces of antireflective films, applying a 2 kilogram, 7.6 centimeter (3 inch) diameter weight to each laminate, and subjecting the weighted laminates to 150° C. for one hour. In addition to unacceptably high increases in % R, several other failure modes are possible, and acceptance criteria for premasks is summarized in Table B.

TABLE B

Acceptance criteria for premasks

| Premask acceptance criteria | How determined/measured | Acceptable results |
|---|---|---|
| Must adhere to the AR coating | Laminate to AR coated film | Sufficient to adhere during aging test |
| Does not contaminate the AR coating | Visual inspection and % R Test | No visible defects and percent reflectance of 1.05-1.25 |
| Does not remove or otherwise mar the AR coating | Visual inspection and % R Test | No visible defects and percent reflectance of 1.05-1.25 |
| Temperature stability | Visual inspection | No wrinkling or debonding of the premask |

Examples 1-3 and Comparative Examples C1 and C2: Premask Tapes

The premask coating formulations were prepared by mixing Monomer-1 resin, Monomer-2 resin, and photoinitiator according to the proportions provided in Table 1. Each mixture was further stirred for ten minutes to ensure uniformity. The resulting premask coating formulations were applied to 2 mil PET films using a #10 Mayer rod (obtained from RD Specialties, Webster, N.Y.). The resulting coated films were then cured to yield premask tapes using a Fusion UV-Systems Inc. Light-Hammer 6 UV processor equipped with an H-bulb (Gaithersburg, Md.), operating under nitrogen atmosphere at 100% lamp power. Coated films were exposed to one pass at a line speed of 9 meters/minute (30 feet/minute) to give a UVA dose=0.368 J/cm$^2$ and UVA Irradiance=1.78 W/cm$^2$ as measured by an EIT Power Puck II.

The premask tapes were laminated to the nanostructured surfaces of AR films using a PL-1200 laminator (Professional Laminating Systems, Inc., Hamilton, Mont.). After the weighted laminates were aged one hour in a 150° C. oven, the premask tapes were removed and the reflectance of the nanostructured antireflective surfaces was measured as described above. A film comprising a nanostructured AR surface that had not been laminated to a premask tape or aged in an oven was used as a control (Comparative Example C1). These reflectance measurements are presented in Table 1, showing that premask tapes made with formulations comprising 15% or more of Monomer-1 adequately protected the nanostructured AR coating, but that the formulation comprising 10% Monomer-1 (Comparative Example C2) did not provide an acceptable level of protection. The Examples were also visually inspected, and the samples that had premask tape attached appeared unchanged after premask tape removal.

TABLE 1

Formulations and testing results.

| Example | Monomer-1 (pbw) | Monomer-2 (pbw) | PI-1 (pbw) | Percent Reflectance of AR after aging |
|---|---|---|---|---|
| C1 | — | — | — | 1.20 |
| 1 | 20 | 80 | 1 | 1.20 |
| 2 | 17.5 | 82.5 | 1 | 1.21 |
| 3 | 15 | 85 | 1 | 1.24 |
| C2 | 10 | 90 | 1 | 1.90 |

Examples 4-6 and Comparative Example C3: Effect of Premask Substrate

The effect of changing the substrate film used to make premask tapes was examined by making premask tapes using "low melt" polyethylene naphthalate (LM-PEN), heat stable PET (HS-PET), and corona treated HS-PET, and testing their ability to protect AR coatings in the high temperature aging test described above.

Monomer-1 (20 pbw) and Monomer-2 (80 pbw) and PI-1 (1 pbw) were combined into a uniform mixture and applied to the HS-PET, the corona-treated HS-PET, and to LM-PEN using a #10 Mayer rod. The coated films were cured using a Fusion UV-Systems Inc. Light-Hammer 6 UV processor equipped with an H-bulb (Gaithersburg, Md.), operating under nitrogen atmosphere at 100% lamp power. Coated films were exposed to one pass at a line speed of 9 meters/minute (30 feet/minute) to give a UVA dose=0.368 J/cm$^2$ and UVA Irradiance=1.78 W/cm$^2$ as measured by an EIT Power Puck II. The resulting premask tapes had a cured coating thicknesses of 12.7-25.4 micrometers (0.5-1.0 mil).

The premask tapes were laminated to the nanostructured surfaces of AR films using a PL-1200 laminator (Professional Laminating Systems, Inc., Hamilton, Mont.). After the weighted laminates were aged one hour in a 150° C. oven, the premask tapes were removed and the reflectance of the nanostructured antireflective surfaces was measured as described above. A film comprising a nanostructured AR surface that had not been laminated to a premask tape or aged in an oven was used as a control (Comparative Example C3). These reflectance measurements are presented in Table 2. It can be seen that premask tapes made using all three alternative substrates provided acceptable protection to AR coatings in the high temperature aging test.

TABLE 2

Effect of substrate on ability of premask tapes to protect AR coatings.

| Example | Premask Tape Substrate | Before Aging-% R | After Aging-% R |
|---|---|---|---|
| C3 | — | 1.10 | 1.08 |
| 4 | LM-PEN | 1.08% | 1.07% |
| 5 | HS-PET | 1.10% | 1.19% |
| 6 | Corona Treated HS-PET | 1.07% | 1.18% |

Examples 7-8 and Comparative Example C4: Effect of Photoinitiatior

For Example 7, the composition Monomer-1 (20 pbw) and Monomer-2 (80 pbw) and PI-2 (1 pbw) was prepared. For Example 8, the composition Monomer-1 (20 pbw) and Monomer-2 (80 pbw) and PI-3 (1 pbw) was prepared. These compositions were applied to Primed HS-PET using a #10 Mayer rod. The coated films were cured using a Fusion UV-Systems Inc. Light-Hammer 6 UV processor equipped with an H-bulb (Gaithersburg, Md.), operating under nitrogen atmosphere at 100% lamp power. Coated films were exposed to one pass at a line speed of 9 meters/minute (30 feet/minute) to give a UVA dose=0.368 J/cm$^2$ and UVA Irradiance=1.78 W/cm$^2$ as measured by an EIT Power Puck II. The resulting premask tapes had a cured coating thicknesses of 12.7-25.4 micrometers (0.5-1.0 mil).

The premask tapes were laminated to the nanostructured surfaces of AR films using a PL-1200 laminator (Professional Laminating Systems, Inc., Hamilton, Mont.). After the weighted laminates were aged one hour in a 150° C. oven, the premask tapes were removed and the reflectance of the nanostructured antireflective surfaces was measured as described above. A film comprising a nanostructured AR surface that had not been laminated to a premask tape or aged in an oven was used as a control (Comparative Example C4). These reflectance measurements are presented in Table 3.

TABLE 3

Effect of photoinitiator on ability of premask tapes to protect AR coatings.

| Example | Before Aging-% R | After Aging-% R |
|---|---|---|
| C4 | 1.10 | 1.08 |
| 7 | 1.07 | 1.20 |
| 8 | 1.08 | 1.07 |

Comparative Premask Tape Testing Examples CT-1-CT-14

Commercially available premask tapes, labelled as examples CT-1-CT-14, were tested for their ability to protect AR coatings in the heat aging test. A description of the commercially available Comparative Tapes is presented in Table 4. The premask tapes were laminated to the nano-structured surfaces of AR films using a PL-1200 laminator (Professional Laminating Systems, Inc., Hamilton, Mont.). After the weighted laminates were aged one hour in a 150° C. oven, the premask tapes were removed. Results are reported in Table 5, and comments on visible failure modes are reported in the "Observations" column. If the premask tape tested sample showed visible signs of failure after aging (such as wrinkling of the premask) or caused visible damage to the AR coating, a reflectance measurement was not usually reported. For premask tapes showing no visible signs of failure, the percent reflectance of the antireflective coatings was measured and compared to the initial values. It can be seen that all commercially available premask tapes tested showed one or more failure modes.

TABLE 4

Description of Comparative Premask Tapes

| Comparative Tape Example Number | Description |
| --- | --- |
| CT-1 | A tape of 79 micrometers (3.1 mil) thickness of ethylene vinyl acetate copolymer (28% vinyl acetate) commercially available as ELVAX 3180 from DuPont, Wilmington, DE on 21 micrometer (0.85 mil) thick PET. |
| CT-2 | A tape of 48 micrometers (1.9 mil) thickness of ethylene acrylic acid copolymer (6.5% acrylic acid) commercially available as PRIMACOR 3330 from Dow, Midland, MI on 14 micrometer (0.56 mil) thick PET. |
| CT-3 | A tape of 35 micrometers (1.4 mil) thickness of ethylene vinyl acetate copolymer (28% vinyl acetate) commercially available as ELVAX 3180 from DuPont, Wilmington, DE on 14 micrometer (0.56 mil) thick PET. |
| CT-4 | A tape of 35 micrometers (1.4 mil) thickness of ethylene vinyl acetate copolymer (12% vinyl acetate) commercially available as ATEVA 1240A from AT Plastics, Brampton, Ontario, Canada on 14 micrometer (0.56 mil) thick PET. |
| CT-5 | A tape of 83 micrometers (3.4 mil) thickness of ethylene acrylic acid copolymer (6.5% acrylic acid) commercially available as PRIMACOR 3330 from Dow, Midland, MI on 14 micrometer (0.56 mil) thick PET. |
| CT-6 | A tape of 20 micrometers (0.8 mil) thickness of ethylene acrylic acid copolymer (6.5% acrylic acid) commercially available as PRIMACOR 3330 from Dow, Midland, MI on 74 micrometer (2.91 mil) thick PET. |
| CT-7 | A tape of 18 micrometers (0.7 mil) thickness of polyester copolymer commercially available as MORESTER AF428 from Rohm and Haas, Philadelphia, PA on 33 micrometer (1.3 mil) thick PET. |
| CT-8 | A tape of 18 micrometers (0.7 mil) thickness of PETG polyester copolymer commercially available as EASTAR GN071 from Eastman Chemical, Kingsport, TN on 33 micrometer (1.3 mil) thick PET. |
| CT-9 | TREDEGAR FORCEFIELD 1035 commercially available from Tredegar Film Products, Marlin, PA. |
| CT-10 | Protection film MASTACK JH-125E20 from ZACROS Fujimori, Japan. |
| CT-11 | Heat stabilized PET film of 102 micrometer (4 mil) thickness commercially available from Toray. |
| CT-12 | Heat stabilized PET film of 51 micrometer (2 mil) thickness commercially available from Toray. |
| CT-13 | Premask film commercially available from Sharp Corp. |
| CT-14 | BOPP (Biaxially Oriented Polypropylene) film of 51 micrometer (2 mil) thickness. |

TABLE 5

Comparative Premask Tape Data

| Example | R % Initial | R % After Aging | Observations |
| --- | --- | --- | --- |
| CT-1 | 1.17 | — | Premask was not temperature stable and damage to AR coating was observed |
| CT-2 | 1.17 | — | Premask was not temperature stable and damage to AR coating was observed |
| CT-3 | 1.17 | — | Premask was not temperature stable and damage to AR coating was observed |
| CT-4 | 1.17 | — | Premask was not temperature stable and damage to AR coating was observed |
| CT-5 | 1.17 | — | Premask was not temperature stable and damage to AR coating was observed |
| CT-6 | 1.17 | — | Premask was not temperature stable and damage to AR coating was observed |
| CT-7 | 1.17 | — | No adhesion of premask to AR coating |
| CT-8 | 1.17 | — | Damage to AR coating |
| CT-9 | 1.17 | — | Damage to AR coating |
| CT-10 | 1.17 | 1.19 | Premask and AR film buckling observed |
| CT-11 | 1.17 | — | No adhesion of premask to AR coating |
| CT-12 | 1.17 | — | No adhesion of premask to AR coating |
| CT-13 | 1.17 | 1.31 | Premask failed to adequately protect the AR coating |
| CT-14 | 1.17 | — | Premask was not temperature stable and wrinkling and debonding were observed |

Different Temperature Comparative Premask Tape Testing: Examples CT-15-CT-16

Comparative Tape Sample CT-15

The premask tape sample CT-9 was tested as before, but at a temperature of 50° C. Even at this lower temperature, the AR film had % R of 1.88 after aging, indicating that the premask tape failed at this relatively low temperature.

Comparative Tape Sample CT-16

The premask tape sample CT-7 was tested as before, but at a temperature of 100° C. Even at this lower temperature, the AR film had % R of 1.39 after aging and the premask tape buckled during testing, indicating that the premask tape failed at this relatively low temperature.

What is claimed is:

1. A tape comprising:
a thermally stable tape backing with a first major surface and a second major surface;
and a low tack adhesive layer at least partially coated on the first major surface of the
tape backing, wherein the low tack adhesive layer comprises a crosslinked, polyester-containing (meth)acrylate-based polymer that is essentially free of volatile components, is unchanged after heat aging of 150° C. for 1 hour under a pressure of 4.31 kiloPascals, and is able to removably adhere to an anti-reflective, nano-structured surface coating of an optical construction, wherein the polyester-containing (meth) acrylate-based polymer is prepared from a reaction mixture comprising: at least one multifunctional polyester-containing (meth) acrylate; at least one polyester-containing (meth) acrylate oligomer; and an initiator.

2. The tape of claim 1, wherein the thermally stable tape backing comprises at least one polyester material.

3. The tape of claim 1, wherein the polyester-containing (meth)acrylate-based polymer is free of tackifying resins, plasticizing resins, and unreacted free radically polymerizable compounds.

4. The tape of claim 1, wherein the reaction mixture comprises:
    75-85 parts by weight based on 100 total parts by weight of reactive components of the at least one multifunctional, polyester-containing (meth)acrylate; and
    15-25 parts by weight based on 100 total parts by weight of reactive components of the at least one polyester-containing (meth)acrylate oligomer.

5. The tape of claim 1, wherein the initiator comprises a photoinitiator.

6. The tape of claim 1, wherein the polyester-containing (meth)acrylate-based polymer has a calculated Tg in the range of −30 to −40° C.

7. The tape of claim 1, wherein the thermally stable tape backing has a thickness of from 51 micrometers to 102 micrometers (2-4 mils).

8. The tape of claim 1, wherein the low tack adhesive layer has a thickness of from 13 micrometers to 25 micrometers (0.5-1.0 mils).

9. The tape of claim 1, further comprising a primer layer disposed between the first major surface of the thermally stable tape backing and the low tack adhesive layer.

10. An optical laminate comprising:
    an optical construction comprising:
        a heat resistant film comprising a first major surface and a second major surface, with an anti-reflective, nanostructured surface coating on the second major surface; and
    a tape removably adhered to the anti-reflective, nanostructured surface coating on the second major surface of the optical construction, the tape comprising:
        a thermally stable tape backing with a first major surface and a second major surface; and
        a low tack adhesive layer at least partially coated on the first major surface of the tape backing, wherein the low tack adhesive layer comprises a crosslinked, polyester-containing (meth)acrylate-based polymer that is essentially free of volatile components, is unchanged after heat aging of 150° C. for 1 hour under a pressure of 4.31 kiloPascals, wherein the polyester-containing (meth) acrylate-based polymer is prepared from a reaction mixture comprising: at least one multifunctional polyester-containing (meth) acrylate; at least one polyester-containing (meth) acrylate oligomer; and an initiator.

11. The optical laminate of claim 10, wherein the heat resistant film comprises a heat resistant polyester film.

12. The optical laminate of claim 10, wherein the heat resistant film further comprises at least one additional layer or coating.

13. The optical laminate of claim 12, wherein the at least one additional layer or coating on the heat resistant film comprises a primer layer, a hardcoat layer, or combinations thereof.

14. A method of preparing an optical article comprising:
    providing an optical construction comprising:
        a heat resistant film comprising a first major surface and a second major surface, with an anti-reflective, nanostructured surface coating on the second major surface;
    providing a tape, the tape comprising:
        a thermally stable tape backing with a first major surface and a second major surface; and
        a low tack adhesive layer at least partially coated on the first major surface of the tape backing, wherein the adhesive layer comprises a crosslinked, polyester-containing (meth)acrylate-based polymer that is essentially free of volatile components, is unchanged after heat aging of 150° C. for 1 hour under a pressure of 4.31 kiloPascals, wherein the polyester-containing (meth) acrylate-based polymer is prepared from a reaction mixture comprising: at least one multifunctional polyester-containing (meth) acrylate; at least one polyester-containing (meth) acrylate oligomer; and an initiator, and is able to removably adhere to the anti-reflective, nanostructured surface of the optical construction;
    adhering the low tack adhesive layer of the tape to the anti-reflective, nanostructured surface coating on the second major surface of the optical construction to form an optical laminate;
    subjecting the optical laminate to a temperature of 150° C. for 1 hour under a pressure of 4.31 kiloPascals; and
    cleanly removing the tape from the anti-reflective, nano-structured surface coating on the second major surface of the optical construction.

15. The method of claim 14, wherein the optical construction further comprises additional layers.

16. The method of claim 14, wherein the optical laminate is formed by heat lamination.

17. The method of claim 14, wherein the polyester-containing (meth)acrylate-based polymer has a calculated Tg in the range of −30 to −40° C.

18. The method of claim 14, further comprising a primer layer disposed between the first major surface of the thermally stable tape backing and the low tack adhesive layer.

* * * * *